United States Patent
Hofman et al.

(10) Patent No.: US 9,264,162 B2
(45) Date of Patent: Feb. 16, 2016

(54) WIRELESS POSITION-TIME SYNCHRONIZATION FOR SCANNING SENSOR DEVICES

(71) Applicant: HONEYWELL ASCa, Inc., Mississauga (CA)

(72) Inventors: Gertjan Hofman, Vancouver (CA); Sudhir Thalore, Burnaby (CA)

(73) Assignee: Honeywell Limited, Mississauga (CA)

( * ) Notice: Subject to any disclaimer, the term of this patent is extended or adjusted under 35 U.S.C. 154(b) by 149 days.

(21) Appl. No.: 13/900,738

(22) Filed: May 23, 2013

(65) Prior Publication Data
US 2014/0348154 A1 Nov. 27, 2014

(51) Int. Cl.
*H04J 3/06* (2006.01)
*G01D 9/00* (2006.01)

(52) U.S. Cl.
CPC ............... *H04J 3/0661* (2013.01); *G01D 9/00* (2013.01); *H04J 3/0667* (2013.01)

(58) Field of Classification Search
None
See application file for complete search history.

(56) References Cited

U.S. PATENT DOCUMENTS

| | | | |
|---|---|---|---|
| 5,029,469 A * | 7/1991 | Chase et al. | 73/159 |
| 6,292,108 B1 * | 9/2001 | Straser et al. | 340/870.11 |
| 6,813,542 B2 | 11/2004 | Peshkin et al. | |
| 6,907,317 B2 | 6/2005 | Peshkin et al. | |
| 7,120,508 B2 | 10/2006 | Peshkin et al. | |
| 7,148,499 B2 | 12/2006 | Lapstun et al. | |
| 7,235,890 B1 | 6/2007 | Jasinski | |
| 7,437,208 B2 | 10/2008 | Muench et al. | |
| 7,567,822 B2 | 7/2009 | Hart et al. | |
| 7,714,735 B2 * | 5/2010 | Rockwell | 340/635 |
| 7,819,034 B2 | 10/2010 | Jasinski | |
| 7,872,574 B2 | 1/2011 | Betts et al. | |
| 7,949,433 B2 | 5/2011 | Hern et al. | |
| 8,219,025 B2 | 7/2012 | Andronic | |
| 8,687,060 B1 * | 4/2014 | Wolff | 348/140 |
| 2005/0192710 A1 | 9/2005 | Thornton et al. | |
| 2008/0049700 A1 * | 2/2008 | Shah et al. | 370/342 |
| 2008/0129495 A1 | 6/2008 | Hitt | |
| 2010/0146356 A1 * | 6/2010 | Park et al. | 714/749 |
| 2010/0146374 A1 * | 6/2010 | Samuelson | 714/807 |

(Continued)

FOREIGN PATENT DOCUMENTS

WO  WO 03/096130 A1  11/2003

OTHER PUBLICATIONS

Tom Rosenberg, Product Line Manager, Balluff Inc., Understanding non-contact transmission of power and sensor signals, Design News, Jun. 1, 2001, www.designnews.com, 7 pages.

*Primary Examiner* — Anh-Vu Ly

(57) ABSTRACT

A method includes wirelessly transmitting one or more messages to a sensor assembly in order to synchronize a clock of the sensor assembly. The method also includes wirelessly receiving multiple sensor measurements of a characteristic of a web of material from the sensor assembly. The method further includes receiving timestamps and position data associated with the sensor measurements. In addition, the method includes correlating the sensor measurements, timestamps, and position data. The sensor measurements from the sensor assembly could be timestamped, and the position data could include timestamped position data. The timestamped position data could be received from a source other than the sensor assembly. The method can further include generating a cross direction profile of the web of material using the sensor measurements, timestamps, and positions.

21 Claims, 3 Drawing Sheets

(56) References Cited

U.S. PATENT DOCUMENTS

2011/0066297 A1* 3/2011 Saberi et al. ................. 700/287
2011/0130916 A1* 6/2011 Mayer ............................ 701/33
2012/0224223 A1* 9/2012 Yamamoto .................. 358/1.15

* cited by examiner

WIRELESS POSITION-TIME SYNCHRONIZATION FOR SCANNING SENSOR DEVICES

TECHNICAL FIELD

This disclosure relates generally to scanning measurement systems. More specifically, this disclosure relates to wireless position-time synchronization for scanning sensor devices.

BACKGROUND

Sheets or other webs of material are used in a variety of industries and in a variety of ways. These materials can include paper, multi-layer paperboard, and other products manufactured or processed in long webs. As a particular example, long sheets of paper can be manufactured and collected in reels.

It is often necessary or desirable to measure one or more properties of a web of material as the web is being manufactured or processed. Adjustments can then be made to the manufacturing or processing system to ensure that the properties stay within desired ranges. Measurements are often taken using one or more scanning heads that move back and forth across the width of the web.

SUMMARY

This disclosure provides wireless position-time synchronization for scanning sensor devices.

In a first embodiment, a method includes wirelessly transmitting one or more messages to a sensor assembly in order to synchronize a clock of the sensor assembly. The method also includes wirelessly receiving multiple sensor measurements of a characteristic of a web of material from the sensor assembly. The method further includes receiving timestamps and position data associated with the sensor measurements. In addition, the method includes correlating the sensor measurements, timestamps, and position data.

In a second embodiment, a system includes a sensor assembly configured to generate multiple sensor measurements of a characteristic of a web of material. The system also includes an apparatus configured to wirelessly transmit one or more messages to the sensor assembly in order to synchronize a clock of the sensor assembly and wirelessly receive the sensor measurements from the sensor assembly. The apparatus is also configured to receive timestamps and position data associated with the sensor measurements and correlate the sensor measurements, timestamps, and position data.

In a third embodiment, an apparatus includes at least one interface configured to wirelessly transmit one or more messages to a sensor assembly in order to synchronize a clock of the sensor assembly. The at least one interface is also configured to wirelessly receive sensor measurements of a characteristic of a web of material from the sensor assembly. The at least one interface is further configured to receive timestamps and position data associated with the sensor measurements. The apparatus also includes at least one processing device configured to correlate the sensor measurements, timestamps, and position data.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
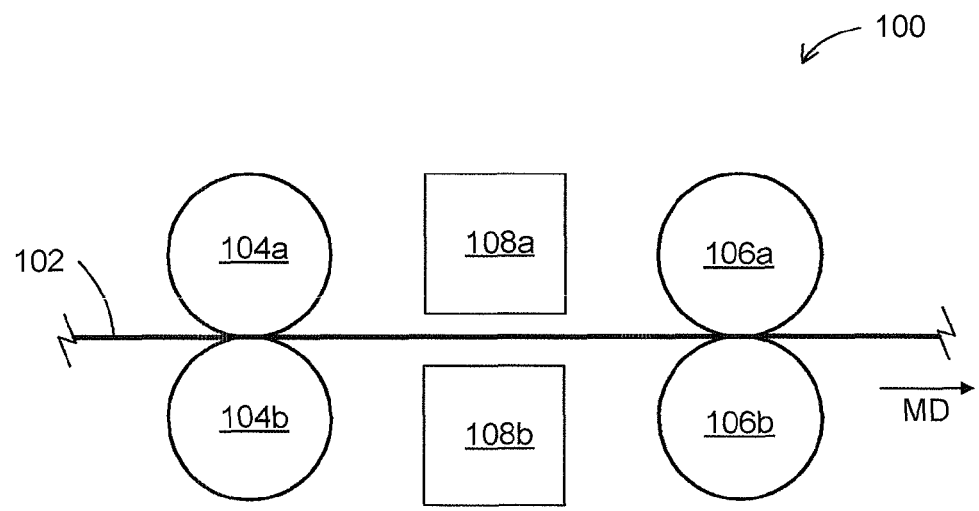
FIG. 1 illustrates a portion of an example web-making or web-processing system in accordance with this disclosure.

FIG. 1 illustrates a portion of an example web-making or web-processing system 100 in accordance with this disclosure. As shown in FIG. 1, the system 100 manufactures or processes a continuous web 102. The web 102 can represent any suitable material or materials manufactured or processed as moving sheets or other webs. Example webs 102 can include paper, multi-layer paperboard, cardboard, plastic, textiles, or metal webs.

In this example, the web 102 is transported through this portion of the system 100 using two pairs of rollers 104a-104b and 106a-106b. For example, the roller pair 104a-104b can pull the web 102 from a previous stage of a web-manufacturing or web-processing system. Also, the roller pair 106a-106b can feed the web 102 into a subsequent stage of the web-manufacturing or web-processing system. The roller pairs 104a-104b and 106a-106b move the web 102 in a direction referred to as the "machine direction" (MD).

One or more scanning sensor assemblies 108a-108b are positioned between the roller pairs 104a-104b and 106a-106b. Each scanning sensor assembly 108a-108b includes one or more sensors capable of measuring at least one characteristic of the web 102. For example, each scanning sensor assembly 108a-108b could include sensors for measuring the moisture, caliper, anisotropy, basis weight, color, gloss, sheen, haze, surface features (such as roughness, topography, or orientation distributions of surface features), or any other or additional characteristics of the web 102. Each scanning sensor assembly 108a-108b includes any suitable structure or structures for measuring or detecting one or more characteristics of a web. For instance, each assembly 108a-108b could include one or more sensors mounted on a scanning head that moves back and forth across the web 102.

In general, a characteristic of the web 102 can vary along the length of the web 102 (in the "machine direction") and/or across the width of the web 102 (in a "cross direction" or "CD"). When a sensor captures measurements of the web 102 as the sensor moves across the web 102 and sends the measurements over a wireless connection, it is often necessary or desirable to know the time that each measurement is taken and the location of the sensor when each measurement is taken, such as the sensor's location in the cross direction. However, transmitting the sensor measurements wirelessly as soon as the sensor measurements are taken is typically inadequate to identify the measurement time and sensor position associated with each measurement. Wireless transmissions are typically not deterministic, and simply relying on the receipt of wireless transmissions containing sensor measurements cannot properly associate the sensor measurements with measurement times and sensor positions.

As described in more detail below, each scanning sensor assembly 108a-108b can communicate wirelessly with an external device or system, such as a computing device that collects measurement data from the scanning sensor assemblies 108a-108b. Each scanning sensor assembly 108a-108b also includes a mechanism for correlating its measurements with timestamps and optionally with sensor positions, or an external device or system can include a mechanism for correlating the sensor measurements and timestamps with sensor positions. In addition, each scanning sensor assembly 108a-108b can communicate with an external device or system to synchronize a clock of that assembly 108a-108b.

In this way, each scanning sensor assembly 108a-108b supports wireless position-time synchronization. Each measurement by a scanning sensor assembly 108a-108b is associated with both a time and a cross direction position where the measurement was taken. These measurements can be converted into a cross direction profile, which identifies a characteristic of the web 102 in the cross direction across the entire width of the web 102. Multiple scans across the web 102 can result in the generation of multiple cross direction profiles, which can be used by a control system to adjust and control the operation of the web-making or web-processing system 100. The wireless position-time synchronization approach can be particularly useful when measurements from sensors on both sides of the web 102 are wirelessly transmitted. The wireless position-time synchronization approach supported by both scanning sensor assemblies 108a-108b allows a control system to identify which measurements from opposite sides of the web 102 are associated with common times and positions of the web 102.

Moreover, the position-time synchronization approach can allow sensor measurements to be captured using "beam-less" scanners. Scanning sensors routinely include moving sensor heads mounted on beams that run in the cross direction, and cables provide power and data to and from the sensor heads. By supporting highly accurate measurements using sensor heads that can transmit and receive data wirelessly, it may be possible to eliminate the use of beams and allow the sensor heads to simply ride on cables or rails used to supply power to the sensor heads. This can reduce the cost and installation complexity of the scanners. Of course, this is not required, and the position-time synchronization approach described below can be used with sensor heads that ride on beams, as well.

Although FIG. 1 illustrates a portion of one example web-making or web-processing system 100, various changes may be made to FIG. 1. For example, while the scanning sensor assemblies 108a-108b are shown here as being used between two pairs of rollers, one or more scanning sensor assemblies could be used in any other or additional location(s) of a web-making or web-processing system. Moreover, FIG. 1 illustrates one operational environment in which wireless position-time synchronization for scanning sensor devices can be used. This functionality could be used in any other type of system.

Figure 2:
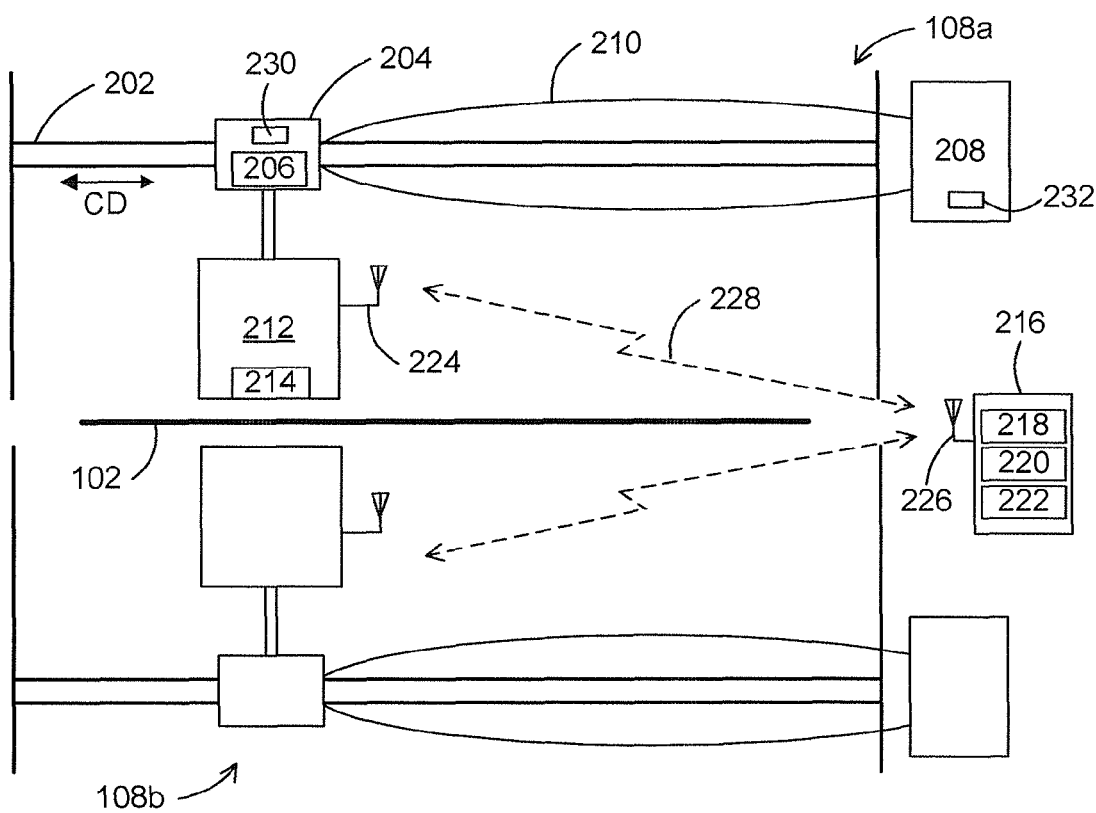
FIG. 2 illustrates example scanning sensor assemblies in the system of FIG. 1 in accordance with this disclosure.

FIG. 2 illustrates example scanning sensor assemblies 108a-108b in the system 100 of FIG. 1 in accordance with this disclosure. In the following description, the structure of the scanning sensor assembly 108a is described. The same or similar structure could be used in the scanning sensor assembly 108b.

As shown in FIG. 2, the scanning sensor assembly 108a includes a track 202 on which a carriage 204 travels. In the system 100, the track 202 could generally extend in the cross direction across the width of the web 102. The carriage 204 can traverse back and forth along the track 202 to move one or more sensors back and forth across the web 102. The track 202 generally includes any suitable structure on which other components of a sensor assembly can move, such as a metal or other beam. The carriage 204 includes any suitable structure for moving along a track.

Various mechanisms can be used to move the carriage 204 along the track 202 or to position the sensor assembly 108a at particular locations along the track 202. For example, the carriage 204 could include a small motor 206 that moves the carriage 204 along the track 202. As another example, an external motor 208 could rotate a belt 210 that is physically connected to the carriage 204, where the belt 210 moves the carriage 204 along the track 202. Any other suitable mechanism for moving the carriage 204 along the track 202 could be used.

A scanning sensor head 212 is connected to the carriage 204. The sensor head 212 includes at least one sensor 214 that captures measurements associated with the web 102. Each sensor head 212 includes any suitable structure for carrying one or more sensors. Each sensor 214 includes any suitable structure for capturing measurements associated with one or more characteristics of a web. A sensor 214 could represent a contact sensor that takes measurements of a web via contact with the web or a non-contact sensor that takes measurements of a web without contacting the web.

Power can be provided to the sensor head 212 in any suitable manner. For example, the sensor head 212 could be coupled to one or more cables that provide power to the sensor head 212. As another example, the carriage 204 could ride on one or more cables or rails used to supply power to the sensor head 212. The sensor head 212 could also include an internal power supply, such as a battery or an inductive coil used to receive power wirelessly. The sensor head 212 could be powered in any other or additional manner.

In this example, the sensor head 212 sends sensor measurement data wirelessly to an external control system 216. The control system 216 could use the measurement data in any suitable manner. For example, as described above, the control system 216 could use the measurement data and associated position-time synchronization information to generate CD profiles of the web 102. The control system 216 could then use the CD profiles to determine how to adjust operation of the system 100. The control system 216 could also use the CD profiles or the measurement data to support monitoring applications, process historian applications, or other process control-related applications.

The control system 216 includes any suitable structure(s) for receiving sensor measurement data, such as one or more computing devices. In particular embodiments, the control system 216 includes one or more processing devices 218, such as one or more microprocessors, microcontrollers, digital signal processors, field programmable gate arrays, or application specific integrated circuits. The control system 216 also includes one or more memories 220, such as one or more volatile and/or non-volatile storage devices, configured to store instructions and data used, generated, or collected by the processing device(s) 218. In addition, the control system 216 includes one or more interfaces 222 for communicating with external devices or systems, such as one or more wired interfaces (like an Ethernet interface) or one or more wireless interfaces (like a radio frequency transceiver). The control system 216 could represent a centralized control system or a distributed control system. In particular embodiments, the control system 216 includes a measurement subsystem (MSS), which interacts with the assemblies 108a-108b to obtain and process measurements of the web 102. The processed measurements can then be provided to other components of the control system 216.

The sensor head 212 and the control system 216 communicate wirelessly. In FIG. 2, the sensor head 212 includes at least one antenna 224, and the control system 216 includes at least one antenna 226. The antennas 224-226 support the exchange of wireless signals 228 between the sensor head 212 and the control system 216. For example, the control system 216 could transmit commands instructing the sensor head 212 to capture measurements of the web 102, and the sensor head 212 can transmit measurements and associated synchronization data to the control system 216. The sensor head 212 could also transmit other data to the control system 216, such as diagnostic data. Each antenna 224-226 includes any suitable structure for transmitting wireless signals, such as radio frequency signals.

As noted above, various mechanisms can be used to move the carriage 204 along the track 202 or to position the sensor head 212 at particular locations along the track 202, such as the motor 206 in the carriage 204 or an external motor 208 and belt 210. In some embodiments, the sensor assembly 108a can track its own location (relative to the web 102 or other reference). For example, the scanning sensor assembly 108a can include a tachometer 230 or other mechanism to measure the rotational speed of the motor 206, which may allow the sensor assembly 108a to identify the distance traveled by the assembly 108a from a known position. As another example, the sensor assembly 108a could include a motor controller for controlling the motor 206, and outputs from the motor controller can be used to estimate the position of the sensor assembly 108a. The scanning sensor assembly 108a could also use marks encoded on the track 202 to identify its current location. The scanning sensor assembly 108a could use any other suitable technique to identify its location. Sensor measurements and position data identified by the sensor assembly 108a can both the timestamped and output to the control system 216.

Alternatively, the scanning sensor assembly 108a may not track its location. Rather, the sensor assembly 108a may operate to output only timestamped measurement data, and an external device or system could be used to identify the positions of the sensor head 212 during the measurements. For example, the motor 208 could include or be associated with a tachometer 232 or other mechanism to measure the distance traveled by the assembly 108a and output timestamped position data. The timestamped measurement data from the sensor assembly 108a and the timestamped position data can be collected and correlated by the control system 216. In general, any suitable mechanism can be used within the sensor assembly 108a or outside the sensor assembly 108a to identify a position associated with the sensor assembly.

In some embodiments, the scanning sensor assembly 108a can operate in conjunction with the control system 216 as follows. The sensor head 212 includes a data acquisition system that converts sensor measurements into digital values. For each sensor measurement, the sensor head 212 pairs the corresponding digital value with a high-resolution timestamp from a local clock in the sensor head 212. If position data is available at the sensor head 212, the sensor head 212 also pairs the digital value with the identified position of the sensor head 212, and all of this information is transmitted to the control system 216. If position data is not available at the sensor head 212, the measurement data and timestamps are transmitted to the control system 216, which receives position data from another source and pairs the position data with the measurement data and timestamps.

Periodically or at other times, the sensor head 212 and the control system 216 exchange messages (such as messages defined by the IEEE 1588 protocol) to update the time of a local clock in the sensor head 212. This synchronizes the sensor head 212 with the control system 216, which allows the control system 216 to accurately correlate measurements by the sensor head 212 in time with other information about the web 102. Among other things, the control system 216 could accurately generate cross direction profiles of the web 102 based on measurements obtained from sensor heads 212 operating on opposite sides of the web 102.

Although FIG. 2 illustrates one example of the scanning sensor assemblies 108a-108b in the system 100 of FIG. 1, various changes may be made to FIG. 2. For example, while two scanning sensor assemblies 108a-108b are shown here, a single scanning sensor assembly or more than two scanning sensor assemblies could be used. Moreover, various components in each scanning sensor assembly 108a-108b could be combined, further subdivided, or omitted and additional components could be added according to particular needs. In addition, the form of each assembly with a carriage 204 connected to a separate sensor head 212 is for illustration only. The sensor head 212 could incorporate the carriage 204 in any suitable manner.

Figure 3:
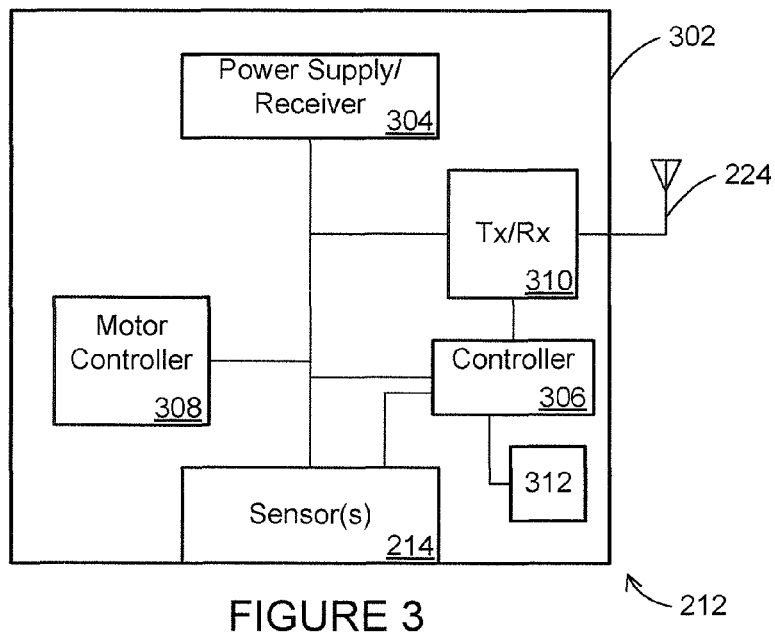
FIG. 3 illustrates an example scanning sensor head in the system of FIG. 1 in accordance with this disclosure.

FIG. 3 illustrates an example scanning sensor head 212 in the system 100 of FIG. 1 in accordance with this disclosure. As shown in FIG. 3, the sensor head 212 includes a moveable chassis 302, which represents a housing or other structure configured to encase, contain, or otherwise support other components of the sensor head 212. The chassis 302 can be formed from any suitable material(s) (such as metal) and in any suitable manner.

The sensor head 212 also includes a power supply/receiver 304, which provides operating power to the sensor head 212. For example, the power supply/receiver 304 could receive AC or DC power from an external source, and the power supply/receiver 304 could convert the incoming power into a form suitable for use in the sensor head 212. The power supply/receiver 304 includes any suitable structure(s) for providing operating power to the sensor head 212, such as an AC/DC or DC/DC power converter. The power supply/receiver 304 may also include a battery, capacitor, or other power storage device.

A controller 306 controls the overall operation of the sensor head 212. For example, the controller 306 could receive measurements from one or more sensors 214 and correlate the sensor measurements with timestamps. The controller 306 could also correlate the sensor measurements with location information (if available). The controller 306 could further control the transmission of this data to the control system 216 or other destination(s). The controller 306 includes any suitable processing or control device(s), such as one or more microprocessors, microcontrollers, digital signal processors, field programmable gate arrays, or application specific integrated circuits. Note that the controller 306 could also be implemented as multiple devices.

A motor controller 308 can be used to control the operation of the motor 206. For example, the motor controller 308 could generate and output pulse width modulation (PWM) or other control signals for adjusting the direction and speed of the motor 206. The direction and speed could be controlled based on input from the controller 306. The motor controller 308 includes any suitable structure for controlling operation of a motor. As described above, however, use of a motor controller 308 is optional since the sensor head 212 could be moved in other ways.

A wireless transceiver 310 is coupled to the antenna(s) 224. The wireless transceiver 310 facilitates the wireless transmission and reception of data, such as by transmitting sensor measurements and related data to the control system 216 and receiving commands from the control system 216. The wireless transceiver 310 includes any suitable structure for generating signals for wireless transmission and/or for processing signals received wirelessly. In particular embodiments, the wireless transceiver 310 represents a radio frequency (RF) transceiver. Note that the transceiver 310 could be implemented using a transmitter and a separate receiver.

A position sensor 312 can optionally be used to identify the position of the sensor head 212. For example, the position sensor 312 could receive data from the tachometer 230 defining the rotational speed of the motor 206. The position sensor 312 could also receive data from the motor controller 308 defining how the motor 206 is being driven. Using this data or other or additional data, the position sensor 312 can identify the sensor head's current position. The current position could be identified in any suitable form, such as an absolute location or a distance from a last-known location. The position sensor 312 could use any other suitable technique for identifying the position of the sensor head 212. The position sensor 312 includes any suitable structure for identifying the location of a sensor head. As described above, however, use of a position sensor 312 is optional since the position of the sensor head 212 could be determined in other ways, including by components outside the sensor assembly 108a.

In some embodiments, the sensor head 212 operates as follows. One or more sensors 214 measure at least one characteristic of the web 102. The controller 306 is coupled to and controls the operation of the sensor(s) 214. The controller 306 receives signals from and sends signals to the wireless transmitter 310, which receives and transmits wireless signals via the antenna 224. The controller 306 can receive commands and configuration messages and, in response, configure and operate the sensor(s) 214. The controller 306 also receives sensor measurements from the sensor(s) 214 and optionally position data from the position sensor 312. The controller 306 correlates the sensor measurements with (i) timestamps identifying when the sensor measurements occurred and (ii) optionally position data identifying where the sensor measurements occurred. The controller 306 then transmits this information via the wireless transceiver 310 to the control system 216 or other destination(s).

At the control system 216, the one or more processing devices 218 can receive the sensor measurements, timestamps, and optionally the position data from the sensor head 212. If position data is not available from the sensor head 212, the control system 216 could receive the position data from other source(s). For instance, the control system 216 could receive timestamped position data from the tachometer 232 or a system that controls the motor 208. The control system 216 could associate sensor measurements with location data using the timestamps, and the control system 216 can generate highly accurate CD profiles of the web 102 using sensor measurements from one or multiple sides of the web 102.

Periodically or at other times, the controller 306 communicates with the control system 216 to synchronize a clock used by the controller 306 with the control system 216. One example synchronization technique involves the exchange of IEEE 1588 synchronization messages, although any other suitable synchronization technique could be used. If location data comes from a source other than the sensor head 212, the control system 216 can also synchronize with the source of the location data.

Although FIG. 3 illustrates one example of a scanning sensor head 212 in the system 100 of FIG. 1, various changes may be made to FIG. 3. For example, various components in FIG. 3 could be combined, further subdivided, or omitted and additional components could be added according to particular needs.

Figure 5:
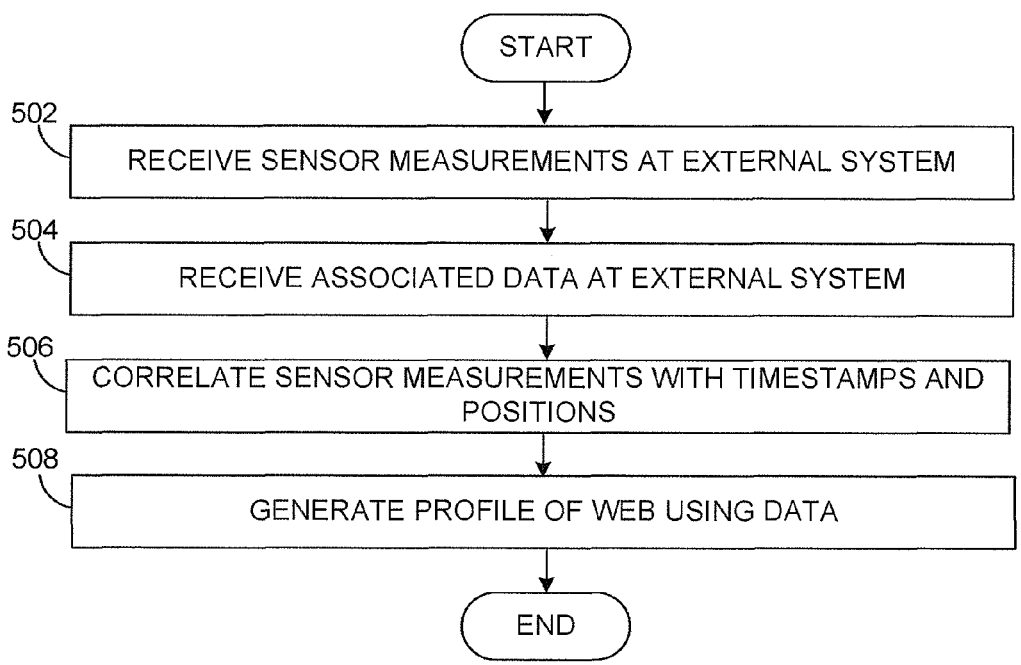
FIGS. 4 and 5 illustrate example methods for wireless position-time synchronization for scanning sensor devices in accordance with this disclosure.
Figure 4:
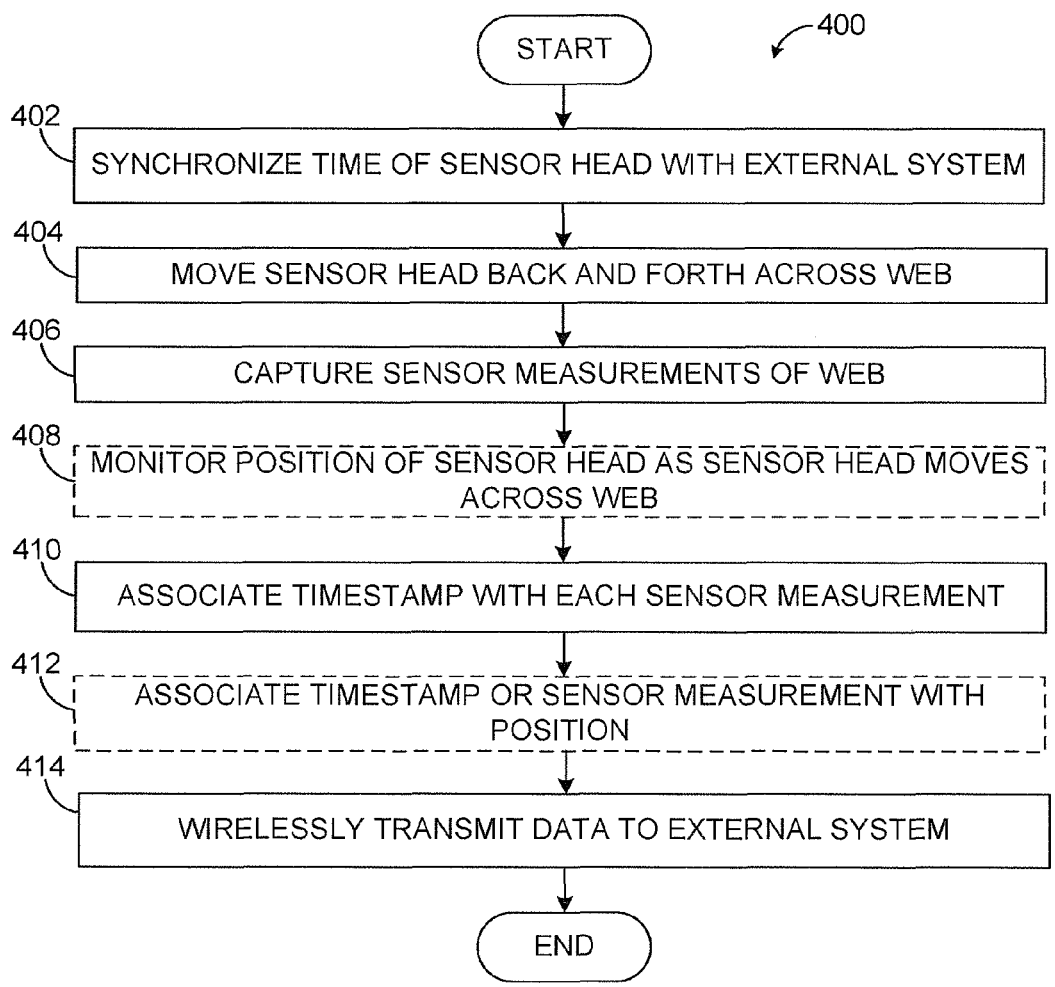

FIGS. 4 and 5 illustrate example methods for wireless position-time synchronization for scanning sensor devices in accordance with this disclosure. In particular, FIG. 4 illustrates an example method 400 performed at the sensor assembly 108a, and FIG. 5 illustrates an example method 500 performed at the control system 216. Of course, either method could be performed by any other suitable device(s) or system(s).

As shown in FIG. 4, a sensor head synchronizes in time with an external system at step 402. This could include, for example, the controller 306 in the sensor head 212 transmitting or receiving messages (such as IEEE 1588 messages) to or from the control system 216 to synchronize an internal clock of the controller 306 with the control system 216.

The sensor head moves back and forth across a web at step 404. This could include, for example, using the motor 206 in the carriage 204 to move the sensor head 212 back and forth across the surface of the web 102. Sensor measurements of the web are captured at step 406. This could include, for example, one or more sensors 214 in the sensor head 212 measuring one or more characteristics of the web 102.

Optionally, the position of the sensor head is monitored as the sensor head moves back and forth across the web at step 408. This could include, for example, the position sensor 312 using any suitable mechanism to identify the location of the sensor head 212. In particular embodiments, this could include the position sensor 312 using data from the tachometer 230 to monitor the distance traveled by the motor 206 from a last-known location.

A timestamp is associated with each sensor measurement at step 410, and optionally each timestamp or sensor measurement is associated with a position at step 412. This could include, for example, the controller 306 associating each sensor measurement with a timestamp identifying when the sensor measurement occurred. This could also include the controller 306 associating each sensor measurement with a position identifying where the sensor measurement occurred (if such position data is available).

The data is transmitted to an external system at step 414. This could include, for example, the controller 306 sending the sensor measurements and associated data to the wireless transceiver 310 for transmission to the control system 216.

As shown in FIG. 5, sensor measurements are received at an external system at step 502, and associated data is received at the external system at step 504. This could include, for example, the control system 216 receiving sensor measurements from one or more sensor assemblies 108a-108b. This could also include the control system 216 receiving timestamps for the sensor measurements from one or more sensor assemblies 108a-108b. This could further include the control system 216 receiving position data from one or more sensor assemblies 108a-108b or receiving position data and timestamps from another source. Note that multiple types of data, such as sensor measurements and timestamps, can be received simultaneously, such as in the same data messages.

The received sensor measurements are correlated with the timestamps and positions at step 506. This could include, for example, the control system 216 identifying sensor measurements from multiple sensor assemblies 108a-108b that are associated with the same position and time. This could also include the control system 216 identifying a sequence of sensor measurements taken by one or more sensor assemblies 108a-108b as the one or more sensor assemblies 108a-108b moved across the web 102. The correlated data is used to generate a profile of the web at step 508. This could include, for example, the control system 216 using the data to construct a CD profile of the web 102. However, the data could be used in any suitable manner. Other example uses include any other monitoring, process historian, or other process control-related application(s).

Although FIGS. 4 and 5 illustrate examples of methods for wireless position-time synchronization for scanning sensor devices, various changes may be made to FIGS. 4 and 5. For example, while shown as a series of steps in each figure, various steps in FIGS. 4 and 5 could overlap, occur in parallel, occur in a different order, or occur any number of times. As particular examples, step 402 could occur at a specified interval, and steps 404-414 could all overlap at the sensor head 212 during operation of the sensor head 212. Moreover, the method 400 could be separately performed by multiple sensor heads 212 scanning the same web 102, such as on different sides of the web 102. In this way, the control system 216 can receive and correlate sensor measurements from multiple sensor heads 212, associating sensor measurements on opposite sides of the web 102 that are taken at the same times and positions relative to the web 102.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   wirelessly transmitting one or more messages to first and second sensor assemblies in order to synchronize clocks of the sensor assemblies;
   wirelessly receiving multiple sensor measurements of at least one characteristic of a web of material from the sensor assemblies, the sensor measurements captured as the sensor assemblies move across the web of material along opposite sides of the web;
   receiving timestamps and position data associated with the sensor measurements; and
   correlating the sensor measurements, timestamps, and position data to identify sensor measurements from the first and second sensor assemblies associated with a same position of the web and a same time.

2. The method of claim 1, wherein the sensor measurements from the sensor assemblies are timestamped.

3. The method of claim 2, wherein the position data comprises timestamped position data.

4. The method of claim 3, wherein the timestamped position data is received from a source other than the sensor assemblies.

5. The method of claim 1, wherein the position data is received from the sensor assemblies.

6. The method of claim 1, wherein the sensor measurements are captured as the sensor assemblies move back and forth in a cross direction across a narrower width of the web of material as the web of material moves lengthwise in a machine direction.

7. A method comprising:
   wirelessly transmitting one or more messages to a sensor assembly in order to synchronize a clock of the sensor assembly;
   wirelessly receiving multiple sensor measurements of a characteristic of a web of material from the sensor assembly;
   receiving timestamps and position data associated with the sensor measurements;
   correlating the sensor measurements, timestamps, and position data; and
   generating a cross direction profile of the web of material using the sensor measurements, timestamps, and positions.

8. The method of claim 7, further comprising:
   adjusting operation of a web-making or web-processing system based on the cross direction profile.

9. A system comprising:
   first and second sensor assemblies configured to generate multiple sensor measurements of at least one characteristic of a web of material as the sensor assemblies move across the web of material along opposite sides of the web; and
   an apparatus configured to:
      wirelessly transmit one or more messages to the sensor assemblies in order to synchronize clocks of the sensor assemblies;
      wirelessly receive the sensor measurements from the sensor assemblies;

receive timestamps and position data associated with the sensor measurements; and correlate the sensor measurements, timestamps, and position data to identify sensor measurements from the first and second sensor assemblies associated with a same position of the web and a same time.

10. The system of claim 9, wherein the sensor assemblies are configured to generate timestamped sensor measurements.

11. The system of claim 10, wherein the sensor assemblies are configured to generate timestamped position data.

12. The system of claim 9, further comprising:
at least one motor configured to move at least one of the sensor assemblies;
wherein the position data is based on operation of the at least one motor.

13. The system of claim 9, wherein the apparatus comprises at least one processing device, at least one memory unit, and at least one wireless interface.

14. The system of claim 9, wherein each of the sensor assemblies comprises:
at least one sensor configured to measure the at least one characteristic of the web of material and generate the sensor measurements;
a controller configured to associate a timestamp with each of the sensor measurements; and
a transceiver configured to wirelessly transmit the sensor measurements and the associated timestamps.

15. The system of claim 14, wherein each of the sensor assemblies further comprises a position sensor configured to identify a position of the sensor assembly during each sensor measurement.

16. The system of claim 15, wherein:
each of the sensor assemblies further comprises a motor configured to move the sensor assembly; and
the position sensor comprises a tachometer.

17. The apparatus of claim 15, wherein:
each of the sensor assemblies further comprises a motor configured to move the sensor assembly and a motor controller configured to control the motor; and
the position sensor is configured to receive an output of the motor controller.

18. A system comprising:
a sensor assembly configured to generate multiple sensor measurements of a characteristic of a web of material; and
an apparatus configured to:
wirelessly transmit one or more messages to the sensor assembly in order to synchronize a clock of the sensor assembly;
wirelessly receive the sensor measurements from the sensor assembly;
receive timestamps and position data associated with the sensor measurements;
correlate the sensor measurements, timestamps, and position data; and
generate a cross direction profile of the web of material using the sensor measurements, timestamps, and positions.

19. An apparatus comprising:
at least one interface configured to:
wirelessly transmit one or more messages to first and second sensor assemblies in order to synchronize clocks of the sensor assemblies;
wirelessly receive sensor measurements of at least one characteristic of a web of material from the sensor assemblies captured as the sensor assemblies move across the web of material along opposite sides of the web; and
receive timestamps and position data associated with the sensor measurements; and
at least one processing device configured to correlate the sensor measurements, timestamps, and position data to identify sensor measurements from the first and second sensor assemblies associated with a same position of the web and a same time.

20. The apparatus of claim 19, wherein the at least one interface is configured to receive timestamped sensor measurements from the sensor assemblies and timestamped position data from a source other than the sensor assemblies.

21. An apparatus comprising:
at least one interface configured to:
wirelessly transmit one or more messages to a sensor assembly in order to synchronize a clock of the sensor assembly;
wirelessly receive sensor measurements of a characteristic of a web of material from the sensor assembly; and
receive timestamps and position data associated with the sensor measurements; and
at least one processing device configured to:
correlate the sensor measurements, timestamps, and position data; and
generate a cross direction profile of the web of material using the sensor measurements, timestamps, and positions.

* * * * *